United States Patent
Cancienne, Jr. et al.

(10) Patent No.: US 9,188,192 B2
(45) Date of Patent: Nov. 17, 2015

(54) BRIDGE SPLICER AND METHOD OF SPLICING CONVEYOR BELTS

(71) Applicant: Laitram, L.L.C., Harahan, LA (US)

(72) Inventors: Warren E. Cancienne, Jr., River Ridge, LA (US); Bryan M. Dillenkoffer, Metairie, LA (US); Steven P. Matherne, Marrero, LA (US)

(73) Assignee: Laitram, L.L.C., Harahan, LA (US)

( * ) Notice: Subject to any disclaimer, the term of this patent is extended or adjusted under 35 U.S.C. 154(b) by 6 days.

(21) Appl. No.: 14/386,544

(22) PCT Filed: Mar. 12, 2013

(86) PCT No.: PCT/US2013/030359
§ 371 (c)(1),
(2) Date: Sep. 19, 2014

(87) PCT Pub. No.: WO2013/158250
PCT Pub. Date: Oct. 24, 2013

(65) Prior Publication Data
US 2015/0068669 A1 Mar. 12, 2015

Related U.S. Application Data

(60) Provisional application No. 61/635,992, filed on Apr. 20, 2012.

(51) Int. Cl.
*B29C 65/78* (2006.01)
*F16G 3/10* (2006.01)
(Continued)

(52) U.S. Cl.
CPC .............. *F16G 3/10* (2013.01); *B29C 65/103* (2013.01); *B29C 65/2076* (2013.01); *B29C 65/305* (2013.01); *B29C 65/7805* (2013.01); *B29C 65/7841* (2013.01); *B29C 65/7844* (2013.01); *B29C 66/0042* (2013.01); *B29C 66/02241* (2013.01); *B29C 66/1142* (2013.01); *B29C 66/1312* (2013.01); *B29C 66/5241* (2013.01); *B29C 66/73921* (2013.01); *B29C 66/8225* (2013.01); *B29C 66/8227* (2013.01);
(Continued)

(58) Field of Classification Search
CPC B32B 38/10; B32B 43/006; Y10T 156/1712; Y10T 156/1744; B29C 65/7858; B29C 65/7888; B29C 65/564
See application file for complete search history.

(56) References Cited

U.S. PATENT DOCUMENTS 2,956,615 A * 10/1960 Hasselquist .................. 156/502
4,082,592 A * 4/1978 Raabe et al. .................. 156/153
(Continued)

FOREIGN PATENT DOCUMENTS

DE 102005034220 A1 1/2007
GB 438845 A 11/1935
(Continued)

*Primary Examiner* — Mark A Osele
*Assistant Examiner* — Nickolas Harm
(74) *Attorney, Agent, or Firm* — James T. Cronvich (57) ABSTRACT

A belt splicer (80) for butt-welding conveyor belts with longitudinal walls and methods for splicing belts. The belt splicer (82, 83) has bridges supporting belt clamps (88) above clamp jaws (12, 13). The bridges are attached at opposite ends to the corresponding jaws. Slots (96) along intermediate spans of the bridges allow the belt clamps to be adjustable positioned along the bridges. Adjacent belt clamps can be positioned with a space between them to accommodate the walls.

13 Claims, 8 Drawing Sheets

(51) Int. Cl.
*B29C 65/00* (2006.01)
*F16G 3/00* (2006.01)
*B29C 65/10* (2006.01)
*B29C 65/20* (2006.01)
*B29C 65/30* (2006.01)
*B29C 65/56* (2006.01)
*B29C 65/18* (2006.01)
*B29L 31/00* (2006.01)

(52) U.S. Cl.
CPC .............. *B29C66/855* (2013.01); *F16G 3/003* (2013.01); *F16G 3/006* (2013.01); *B29C 65/18* (2013.01); *B29C 65/564* (2013.01); *B29C 65/7858* (2013.01); *B29C 65/7888* (2013.01); *B29C 66/4322* (2013.01); *B29C 66/4324* (2013.01); *B29C 66/71* (2013.01); *B29L 2031/7092* (2013.01)

(56) References Cited

U.S. PATENT DOCUMENTS

| | | | |
|---|---|---|---|
| 4,765,862 A | | 8/1988 | Azuma |
| 4,867,835 A | | 9/1989 | Poole |
| 5,690,776 A | | 11/1997 | Anderson |
| 6,375,770 B1 * | | 4/2002 | Meltzer et al. ............... 156/73.4 |
| 6,893,531 B1 * | | 5/2005 | Todaro et al. ............... 156/304.3 |
| 2004/0118513 A1 * | | 6/2004 | Dyrlund et al. ............ 156/304.1 |
| 2009/0007741 A1 | | 1/2009 | Zieger |
| 2011/0067801 A1 * | | 3/2011 | van't Schip ................... 156/157 |

FOREIGN PATENT DOCUMENTS

| JP | S5159980 A | 5/1976 |
|---|---|---|
| WO | 2011046831 A1 | 4/2011 |

\* cited by examiner

BRIDGE SPLICER AND METHOD OF SPLICING CONVEYOR BELTS

BACKGROUND

The invention relates generally to splicing tools for thermally joining the butt ends of plastic conveyor belts and, more particularly, to splicing tools that have position-adjustable clamps for firmly holding conveyor belts having longitudinal walls in place during splicing.

Splicing presses are used to weld the butt ends of two thermoplastic conveyor belt sections together. Conventional presses include a pair of clamps, each of which holds one of the two belt sections. The clamps, which extend across the entire width of the belt sections, firmly hold the sections with the butt ends facing each other across a gap. A heating wand is moved into the gap, and the two clamps close until the butt ends of the belt sections contact opposite sides of the heating wand. As soon as the butt ends are softened or melted sufficiently by the wand's heat, the clamps are retracted so that the wand may be removed. Then the clamps are moved toward each other until the softened or melted butt ends meet. The clamps hold the butt ends together as the joint at their interface cools.

Although splicing presses as described work well with belts that have a flat outer surface, they do not work well with belts having vertical walls, such as corrugated sidewalls, that extend along the length of the belt.

SUMMARY

This shortcoming is addressed by a belt splicer embodying features of the invention. The belt splicer comprises first and second clamp jaws separated by a gap. A first bridge has a span supported between a first end support attached to the first end of the first clamp jaw and a second end support attached to the second end of the first clamp jaw. A second bridge is similarly constructed and attached to the second clamp jaw. One or more first clamps are independently positionable along the span of the first bridge. The first clamps extend toward the first clamp jaw to clamp a first conveyor belt end against the first clamp jaw. One or more second clamps are independently positionable along the span of the second bridge. The second clamps extend toward the second clamp jaw to clamp a second conveyor belt end against the second clamp jaw.

In another aspect of the invention, a method for splicing butt ends of a conveyor belt having a wall upstanding from an outer surface of the conveyor belt along its length comprises: (a) separating the bottom of a wall upstanding from the outer surface of a conveyor belt at butt ends of the conveyor belt; (b) inserting the butt ends aligned in a confronting relationship in a belt splicer having position-adjustable clamps for each of the butt ends; (c) adjusting the lateral positions of the clamps at each of the butt ends to provide a space between a pair of adjacent clamps to receive the upstanding wall; (d) clamping the butt ends with the clamps; (e) welding the butt ends together in the belt splicer.

BRIEF DESCRIPTION OF THE DRAWINGS

These features of the invention, as well as its advantages, are better understood by referring the following description, appended claims, and accompanying drawings, in which:

DETAILED DESCRIPTION

Figure 1:
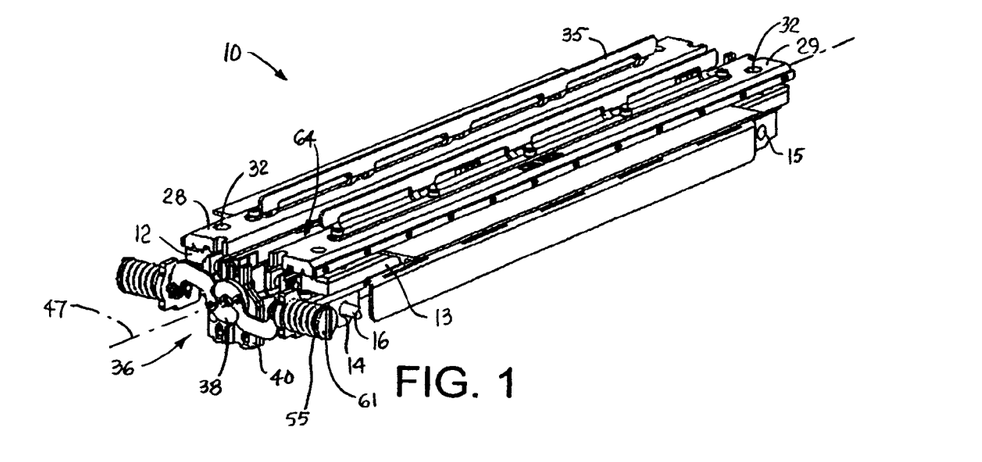
FIG. 1 is an isometric view of a prior-art belt splicer.
Figure 2:
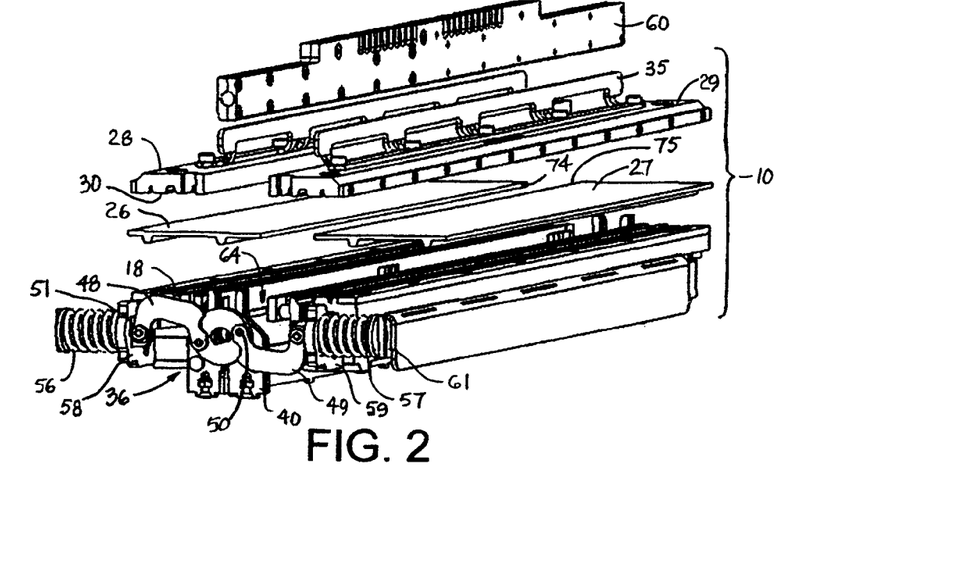
FIG. 2 is an exploded view of the prior-art belt splicer of FIG. 1.
Figure 3:
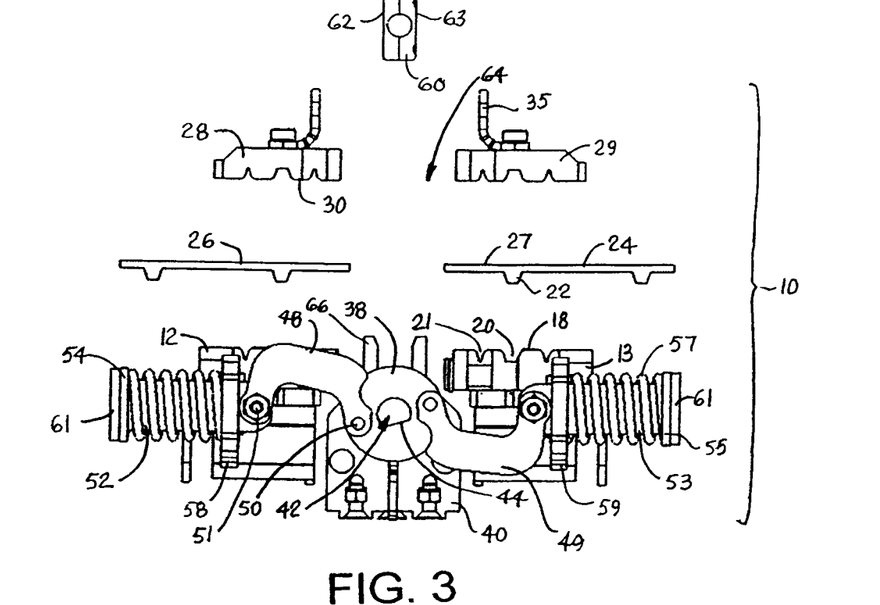
FIG. 3 is an exploded end elevation view of one end of the prior-art belt splicer of FIG. 1.

A prior-art splicing tool is shown in FIG. 1 and with a heating wand in FIGS. 2 and 3. The tool 10, which is generally symmetric end to end and left to right, includes left and right clamp jaws 12, 13 having holes 14, 15 at each end of the tool. The holes in the left clamp jaw align with the holes in the right clamp jaw. Transverse rails 16 extending through the holes 14, 15 and supported in the splicing tool's frame align the clamp jaws and provide supporting guides along which the jaws move toward and away from each other. An upper deck 18 on the clamp jaws 12, 13 has alignment grooves 20, 21 recessed inward of its top surface to mate with structure, such as transverse ribs 22 on a non-flat side of a conveyor belt 24 to be spliced. For the conveyor belt shown in FIG. 3, the drive rib 22 is received in the wider groove 20 in the upper deck 18 of the clamp jaw. The narrow grooves 21 accommodate belts having narrower transverse ribs. The grooves allow the belt end sections 26, 27 to sit flat on the upper deck of the jaws to register both belt sections vertically and horizontally in alignment.

The two belt end sections 26, 27 to be spliced together are sandwiched between the corresponding left and right clamp jaws 12, 13 and left and right top clamps 28, 29. A bottom surface 30 of the top clamps is grooved like the upper deck 18 of the clamp jaws so that the belt end sections 26, 27 may alternatively be welded together bottom side up, such as when splicing a belt together in situ in the lower returnway. The top clamps have alignment holes 32 at each end that receive pins 34 (FIG. 5) to align the top clamps with the corresponding clamp jaws even during translation of the clamp jaws. Elongated handles 35 fastened to the top of the top clamps aid in easy removal of the top clamps to release the spliced belt.

The clamp jaws are opened and closed by a toggle linkage assembly 36—one at each end of the splicer. The toggle linkage assembly includes a central hub 38 rotatably mounted on a support block 40 fastened to the splicer frame. The hub has a central bore 42 with a flat 44. The hub is mounted on a shaft 46 (FIG. 5) that extends the length of the splicer and defines an axis of rotation 47 of the hub. The hub of the toggle linkage assembly at the other end of the splicer is mounted on the other end of the shaft. The shaft extends outward past one or both of the toggle linkage assemblies to receive a handle, such as one of those depicted in FIGS. 8 and 9, for an operator to operate the splicer.

U-shaped left and right linkage arms 48, 49 are mounted to the face of the hub 38 on pivots 50 at the proximal ends of the arms. The pivots are diametrically opposite each other across the axis 47 of the hub 38. Distal ends of the arms are pivotally attached at pivots 51 to ends of left and right drawbars 52, 53 of spring assemblies. The drawbars terminate at their opposite ends in heads 61 retaining left and right spring retainers 54, 55. Left and right compression springs 56, 57 coaxially surrounding the drawbars 52, 53 extend from the spring retainers 54, 55 to left and right spring seats 58, 59 integral with the clamp jaws 12, 13. The spring assemblies form a spring mechanism that enables the closing and rapid opening of the clamp jaws. A heating wand 60 housing a heating element between opposite contact sides 62, 63 is positionable in a gap 64 between the clamp jaws and registered in position by wand rests 66 extending up from the hub support 40.

Figure 4A:
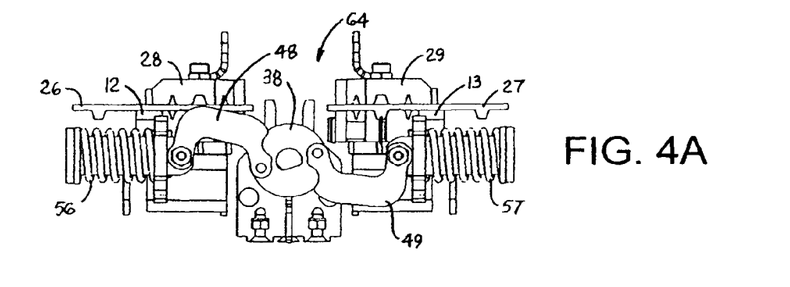
FIGS. 4A-4E are end elevation views of the prior-art belt splicer of FIG. 1, showing the operation of the toggle linkage assembly during the heating process.
Figure 4B:
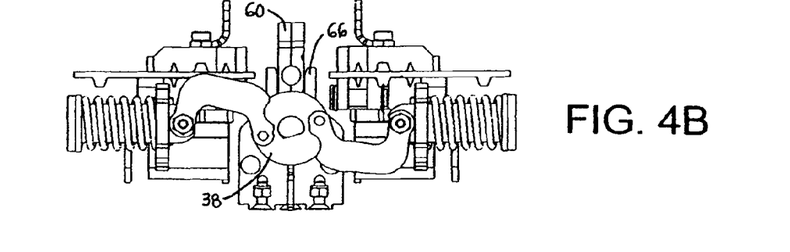
Figure 4C:
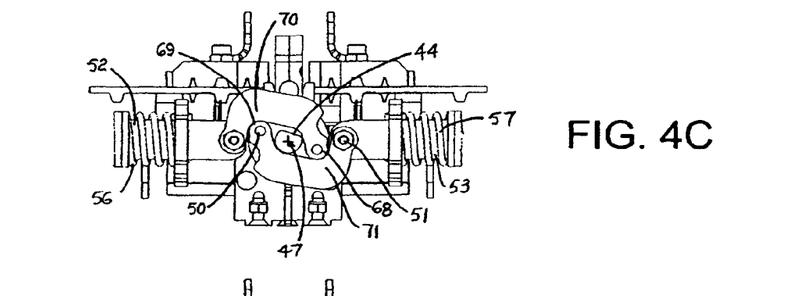
Figure 4D:
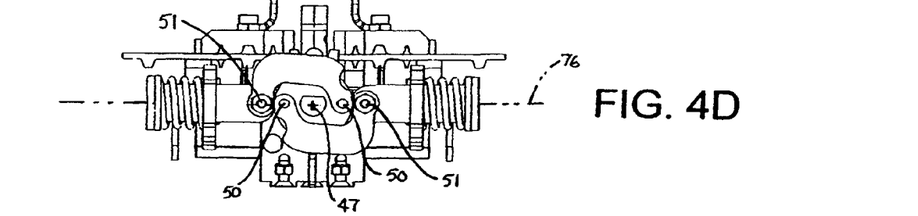
Figure 4E:
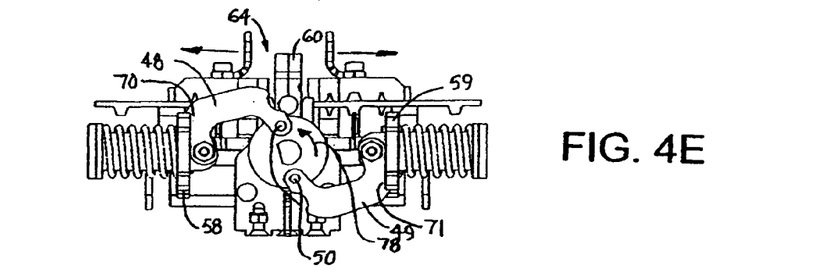
Figure 5:
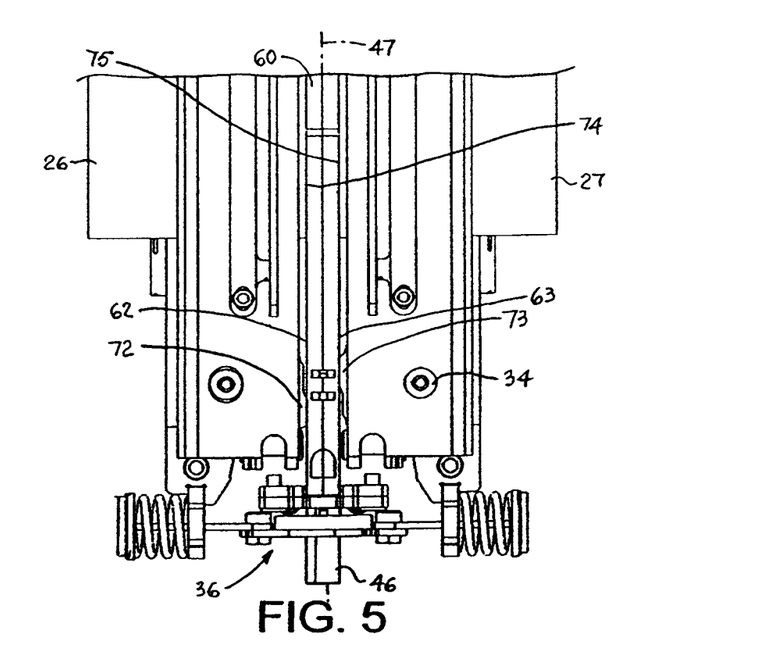
FIG. 5 is a top plan view of one end of the prior-art belt splicer of FIG. 1 during the heating process.

The operation of the toggle linkage assembly 36 is illustrated in FIGS. 4A-4E. In FIG. 4A, the clamp jaws 12, 13 are separated a maximum distance across the gap 64. The belt end sections 26, 27 are clamped between the clamp jaws and the top clamps 28, 29 on each side of the gap. The hub 38 is rotated to an angular position for which the linkage arms 48, 49 do not overlap vertically and the springs 56, 57 are in an elongated, generally relaxed state with little stored energy. This represents the fully released position of the toggle linkage assembly. In FIG. 4B, the heating wand 60 is shown placed between the wand rests 66. The toggle linkage hub 38 is still in the fully released position. In FIG. 4C, the toggle linkage assembly 38 is shown in its locked position. The flat 44 on the bore 42 of the hub 38 indicates that the hub has been rotated clockwise about 210° from its fully relaxed position in FIG. 4B. In the locked position, the two linkage arms overlap each other with their proximal pivots 50 on the hub in an over-center position on opposite sides of the hub's axis of rotation 47 from their distal pivotal connections 51 with the drawbars 52, 53. The proximal ends 68, 69 of the arms nestle behind each other's knees 70, 71, which provide stops that prevent the compressed springs 56, 57 from rotating the hub portion. With the toggle linkage assembly in this stable, locked position, the springs close the clamp jaws until spacer pads 72, 73 on the confronting faces of the clamp jaws at each end of the jaws contact the sides 62, 63 of the wand 60, as shown in FIG. 5. The butt edges 74, 75 (FIG. 2) of the belt sections 26, 27 contact the sides of the wand in this closed position and are melted. Meanwhile, the linkage arms 48, 49 pull the drawbars 52, 53 toward the hub 38, compressing the springs 56, 57. In this state, the energy stored in the compressed springs is close to a maximum.

Once the butt edges 74, 75 are sufficiently melted by the heating wand 60, the clamp jaws 12, 13 can be released. The hub 38 is rotated counterclockwise. At the toggle position of the toggle linkage assembly, as shown in FIG. 4D, the proximal pivots 50 and the distal pivots 51 of both arms are in line with each other, with the axis of rotation 47 of the hub, and with the axis 76 of the drawbars. This also represents the greatest compression of the springs and, so, the maximum energy stored in the springs. As soon as the hub is rotated slightly more counterclockwise, the compressed springs rapidly release their stored energy into the linkage arms 48, 49, which rotate the hub counterclockwise 78 as shown in FIG. 4E. The freewheeling hub rotates the proximal pivots 50 of the linkage arms, whose knees 70, 71 push outward against the spring seats 58, 59 with a short-duration, high-amplitude force impulse to open the clamp jaws. The sudden freewheeling of the hub accelerates the opening of the clamp jaws to rapidly separate the belt edges of the belt section from the sides of the heating wand. The rapid separation of the butt edges from the wand caused by the rapid release of the spring energy into the toggle linkage assembly to create the force impulse that acts against each of the clamp jaws' spring seats in opposite directions prevents sticky thermoplastic belt material, such as polyester, from sticking to the sides of the wand. The hub continues to freewheel counterclockwise until it reaches its fully retracted position in FIG. 4A. The wand 60 can then be lifted from the gap 64. To prevent the clamp jaws from rebounding and reclosing, the linkage arms compress the springs slightly by pushing against the spring seats when the hub is in a position between that of FIGS. 4E and 4A. Thus, the toggle linkage assembly represents one means for rapidly releasing the clamp jaws.

Figure 6:
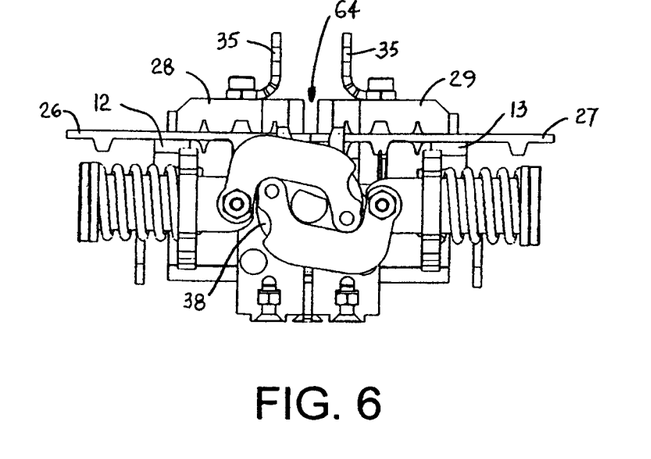
FIG. 6 is an end elevation view of the prior-art belt splicer of FIG. 1, showing the butt-welding process.
Figure 7:
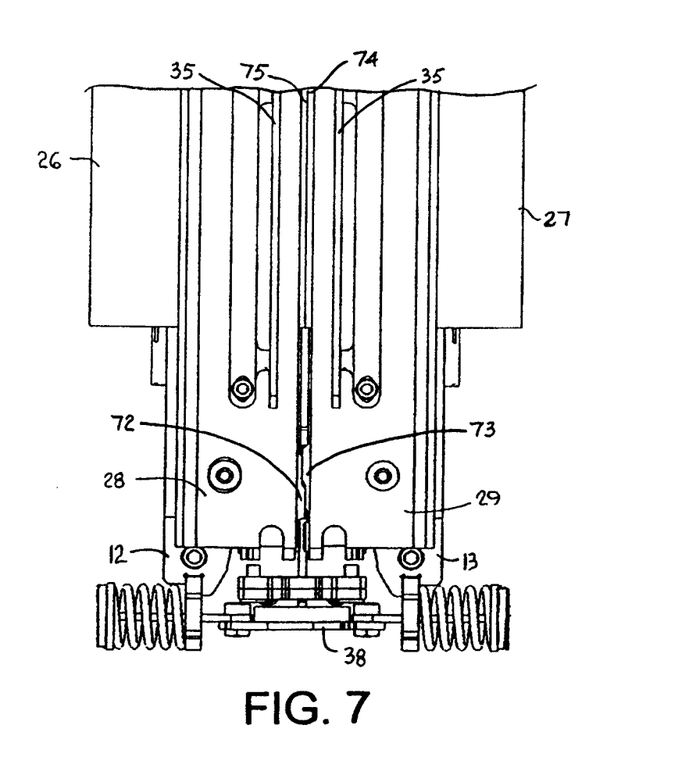
FIG. 7 is a top plan view of one end of the prior-art belt splicer of FIG. 1, showing the belt butt-welding process.

After the heating wand is removed, the clamp jaws 12, 13 are closed again by rotating the hub 38 clockwise past the over-center toggle point to the locked position, as shown in FIGS. 6 and 7. With the wand absent, the gap 64 between the jaws is narrower so that the melted butt edges 74, 75 of the belt sections 26, 27 are pressed tightly together as the weld cures. The confronting spacer pads 72, 73 at each end of the clamp jaws are in contact to maintain the proper distance between the clamp jaws so that the pitch of the belt, as measured between consecutive transverse ribs, is maintained. Once the two belt sections are welded together, the upper clamps 28, 29 are lifted by the handles 35, and the welded belt is removed from the splicer.

Figure 8:
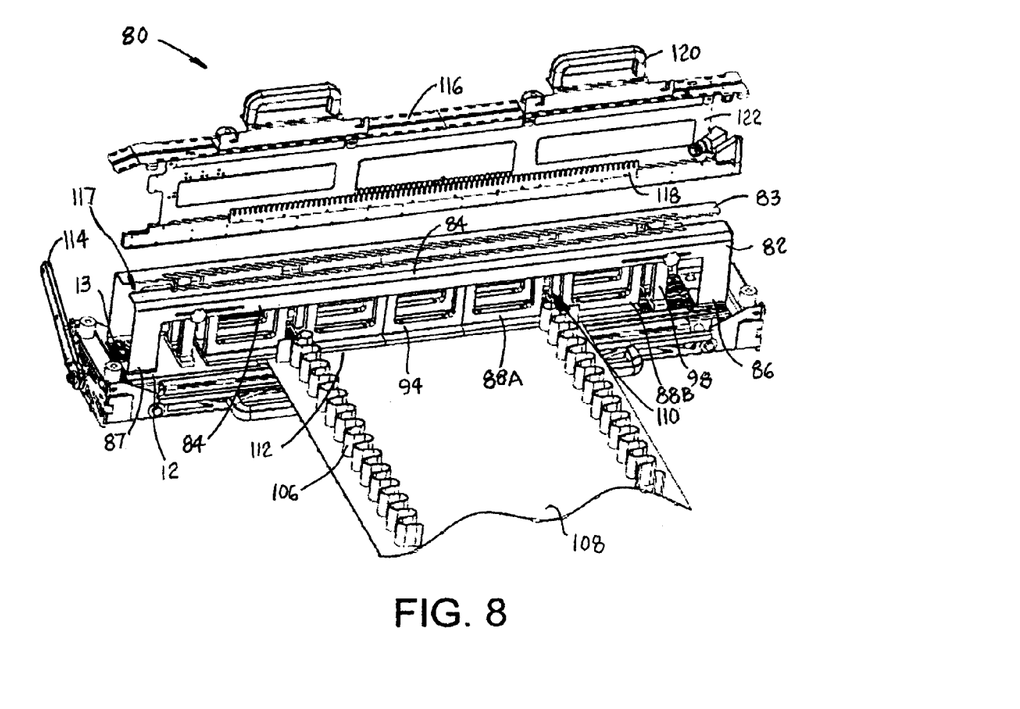
FIG. 8 is an isometric view of a bridge splicer embodying features of the invention.
Figure 9:
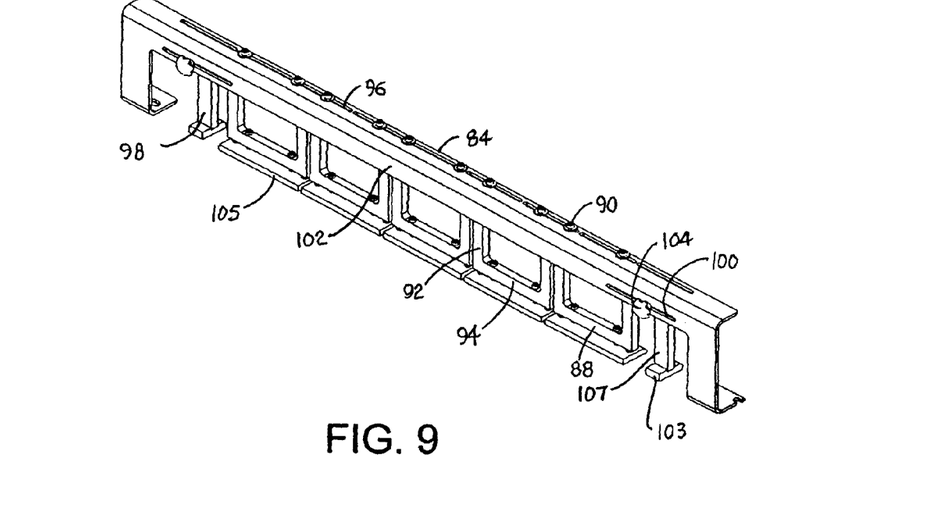
FIG. 9 is an isometric view of one of the bridges in the belt splicer of FIG. 8.
Figure 10:
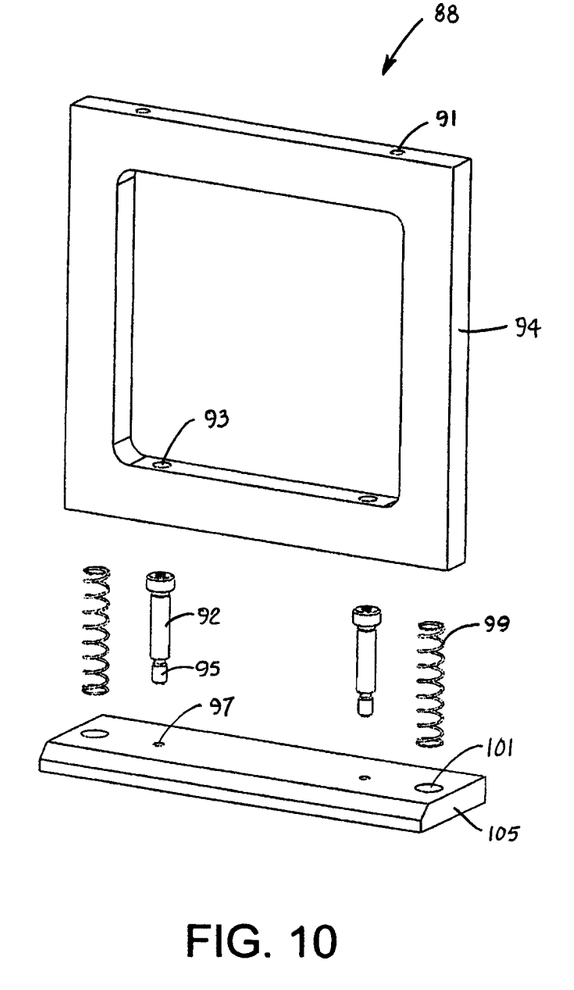
FIG. 10 is an exploded isometric view of a belt clamp in the bridge splicer of FIG. 8.

FIG. 8 shows a belt splicer embodying features of the invention that make it especially useful in splicing belt sections that have longitudinal walls. The splicer 80 can be similar to the prior-art splicer shown in FIGS. 1-7, but can be any kind of clamp-type splicer for plastic belt sections. The splicer 80 differs from the splicer of FIGS. 1-7 in that it further includes bridges 82, 83—one on each half of the splicer. Each bridge has an intermediate span 84 supported between end supports 86, 87. The end supports 86, 87 are attached to the opposite ends of the clamp jaws 12, 13. As shown in FIG. 9, one or more belt clamps 88 are fastened to the span 84 by screws 90, bolts, or any suitable fasteners. In this example, the screws 90 engage threaded holes 91 in the top ends of clamp frames 94, as shown in FIG. 10. Slots 96 formed in the top surface of the span allow the clamps 88 to be adjustable and independently positioned along the span. The fastening screws 90 extend through the slots and into the threaded holes. Tightening the screws fixes the clamps firmly to the bridge in the desired locations. Clamp foot plates 105 are slidably attached to the bottoms of the frames 94 by shoulder bolts 92 extending through through holes 93. Threaded ends 95 of the shoulder bolts screw into threaded holes 97 in the clamp plates 105. The shoulder bolts can slide through the through holes to provide a range of separations between the plates and the frames. Springs 99 retained in recesses 101 in the clamp plates 105 and in corresponding recesses in the bottoms of the frames 94 bias the plates downward from the frames against the upper surface of the belting to account for variations in the upper surface of the belt section to be spliced. Outermost clamps 98 with short foot plates 103 flank the belt clamps 88 and clamp the outermost side edges of the belt sections to be spliced. The foot plates 103 are fastened directly to legs 107 of the outermost clamps 98 without intermediate springs and shoulder bolts. In this way, the outermost clamps 98 are fixed in length to firmly clamp the belt edges while the interior clamps 88 are self-adjusting in length to conform to variations in the upper surface of the belt across its width. Slots 100 in front faces 102 of the spans admit an adjustment thumb screw 104 into the outermost clamps to lock them in their desired positions.

As shown in FIG. 8, the bridges 82, 83 with position-adjustable clamps enable the splicer to be used to splice belts having vertical walls, such as corrugated sidewalls 106, extending along the length of a conveyor belt 108. The clamps 88 are positioned along the span 84 of the bridge 82 with a space 110 between adjacent clamps (88A, 88B) to accommodate the sidewalls 106. The butt ends 113 of the belt are clamped between the clamp plates 105 and the clamp jaws 12. A lever 114 opens and closes the clamp jaws 12, 13. A heating wand 116 having a heating element 118 is inserted into gaps 117 between the bridges to soften or melt the two butt ends. The heating element is attached to handles 120 by an extender frame 122 to accommodate the height of the bridge.

Figure 11A:
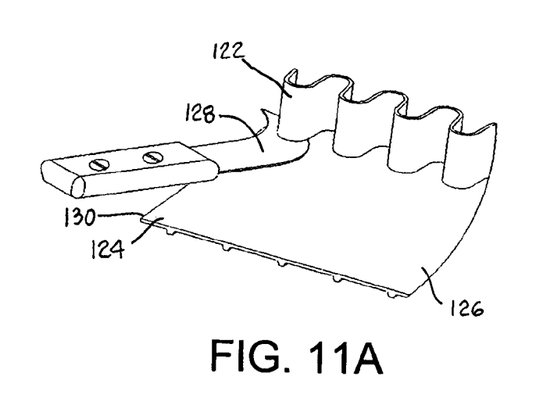
FIGS. 11A-11F illustrate steps in the splicing of conveyor belting with longitudinal walls.
Figure 11B:
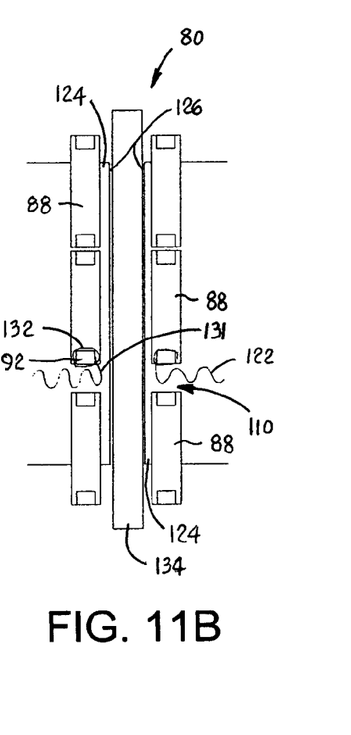
Figure 11C:
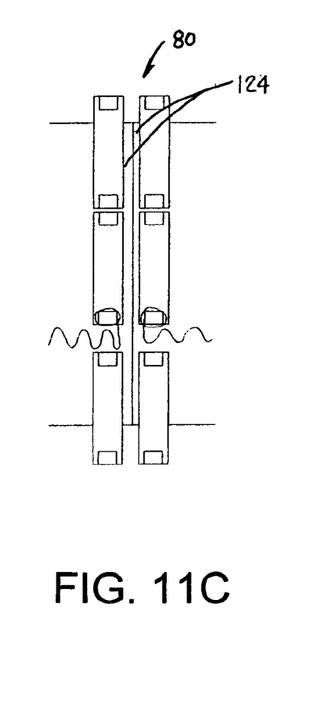
Figure 11D:
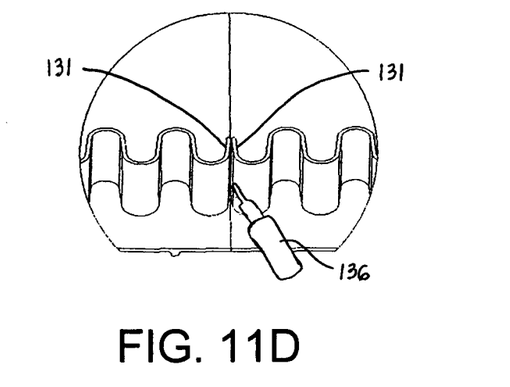
Figure 11E:
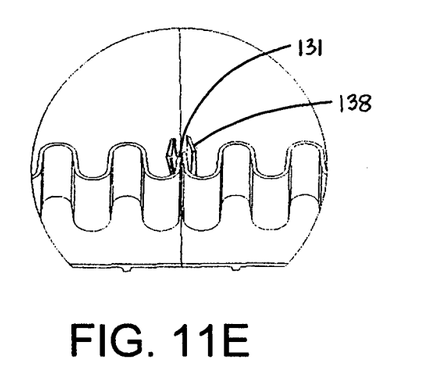
Figure 11F:
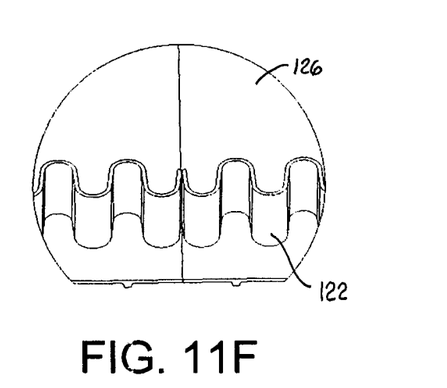

The method of splicing conveyor belting having a longitudinal wall extending along its length is illustrated in FIGS. 11A-11F. First, as shown in FIG. 11A, the bottom of the wall 122 is separated from the butt end 124 of the belting 126 with a knife blade 128, for example. The wall is cut back an inch or so or enough that the separated portion of the wall can be held away from the butt edge 130 of the belting during welding. As shown in the top plan view of FIG. 11B, the butt ends 124 to be spliced are then inserted in the belt splicer 80 with their butt edges 126 aligned in a confronting relationship. The lateral positions of the clamps 88 on the bridges are adjusted at each of the butt ends to provide the space 110 between a pair of adjacent clamps to receive the wall 122. The butt ends are then clamped to the associated clamp jaws by the clamps. The separated ends 131 of the walls are held away from the butt edges 126 such as by taping them with tape 132 to the arms 92 of the clamp frames. Next, the butt ends are softened or melted by the heating element 134. Once the butt edges 130 are heated sufficiently, the heating element is moved away and the butt ends 130 are pressed together by the splicer and welded, as shown in the top plan view of FIG. 11C. The separated wall ends 131 are untaped, the splicer's clamps are released, and the spliced belting removed from the splicer. The separated ends 131 of the walls of each belt section are then connected by the application of hot air from a hot air blower 136, as shown in FIGS. 11D and 11E. The hot air is directed at an overlapped portion of the two separated wall ends 131 until they are softened. As an alternative to convective heating by hot-air blowers, the wall ends can be connected by conductive heating through direct contact with a hot iron. The softened ends 131 are then clamped together by a clamp 138, as shown in FIG. 11E until a bond forms. The clamp is removed, and the splicing of the belting 126 and its wall 122 is completed, as shown in FIG. 11F.

What is claimed is:

1. A belt splicer comprising:
   first and second clamp jaws separated by a gap and each having a first end and a second end spaced apart in a lateral direction across the belt splicer;
   a first bridge having a span supported between a first end support attached to the first end of the first clamp jaw and a second end support attached to the second end of the first clamp jaw to extend across the belt splicer in the lateral direction;
   a second bridge having a span supported between a first end support attached to the first end of the second clamp jaw and a second end support attached to the second end of the second clamp jaw to extend across the belt splicer in the lateral direction;
   a plurality of position-adjustable first clamps attached to the span of the first bridge at selected lateral positions and extending toward the first clamp jaw to clamp a first conveyor belt end against the first clamp jaw;
   a plurality of position-adjustable second clamps attached to the span of the second bridge at selected lateral positions and extending toward the second clamp jaw to clamp a second conveyor belt end against the second clamp jaw.

2. A belt splicer as in claim 1 wherein the first and second bridges include slots extending along the spans between the first and second ends and fasteners positionable along the slots and attaching the clamps to the bridges at the selected lateral positions.

3. A belt splicer as in claim 1 wherein at least one laterally consecutive pair of the first clamps are separated by a space and wherein at least one laterally consecutive pair of the second clamps are separated by a space.

4. A belt splicer as in claim 1 wherein the first and second clamps are self-adjusting in length to conform to variations in the surface of the first and second belt ends.

5. A belt splicer as in claim 4 wherein the first and second clamps include frames, foot plates slidably attached to the frames, and springs between the frames and the foot plates biasing the foot plates away from the frames.

6. A belt splicer as in claim 4 further comprising fixed-length outermost clamps flanking the first and second clamps on the first and second bridges.

7. A method for splicing butt ends of conveyor belting having a wall upstanding from an outer surface of the conveyor belting along its length, the method comprising:
   separating the bottom of a wall upstanding from the outer surface of conveyor belting at butt ends of the conveyor belting;
   inserting the butt ends aligned in a confronting relationship in a belt splicer having position-adjustable clamps for each of the butt ends;
   adjusting the lateral positions of the clamps at each of the butt ends to provide a space between a pair of adjacent clamps to receive the upstanding wall;
   clamping the butt ends with the clamps;
   welding the butt ends together in the belt splicer.

8. The method of claim 7 wherein the bottom of the wall is separated by cutting.

9. The method of claim 7 further comprising:
   releasing the clamps to release the welded conveyor belting; and
   connecting the separated walls together at the welded butt ends.

10. The method of claim 9 wherein the separated walls are connected together by heating the separated walls by convective heating.

11. The method of claim 10 further comprising clamping the separated walls together after they are heated.

12. The method of claim 9 wherein the separated walls are connected together by heating the separated walls by conductive heating.

13. The method of claim 12 further comprising clamping the separated walls together after they are heated.

* * * * *